(12) United States Patent
Seba et al.

(10) Patent No.: US 11,788,494 B2
(45) Date of Patent: Oct. 17, 2023

(54) SYSTEM FOR SUPPLYING A GASEOUS FUEL

(71) Applicant: Liebherr Machines Bulle SA, Bulle (CH)

(72) Inventors: Bouzid Seba, Broc (CH); Ulrich Weiss, Villars-sur-Glane (CH)

(73) Assignee: LIEBHERR MACHINES BULLE SA, Bulle (CH)

( * ) Notice: Subject to any disclaimer, the term of this patent is extended or adjusted under 35 U.S.C. 154(b) by 0 days.

(21) Appl. No.: 17/334,559

(22) Filed: May 28, 2021

(65) Prior Publication Data
US 2021/0372350 A1 Dec. 2, 2021

(30) Foreign Application Priority Data
May 28, 2020 (CH) .................................... 00638/20

(51) Int. Cl.
*F02M 21/02* (2006.01)

(52) U.S. Cl.
CPC .... *F02M 21/0245* (2013.01); *F02M 21/0221* (2013.01); *F02M 21/0239* (2013.01); *F02M 21/0287* (2013.01)

(58) Field of Classification Search
CPC ........... F02M 21/0287; F02M 21/0239; F02M 21/0221; F02M 21/0245
See application file for complete search history.

(56) References Cited

U.S. PATENT DOCUMENTS

| 2016/0273491 A1* | 9/2016 | Foege | F02M 21/06 |
| 2019/0032618 A1* | 1/2019 | Soleri | B08B 17/06 |

FOREIGN PATENT DOCUMENTS

| DE | 102016220851 A1 | 4/2018 |
| DE | 102017130477 A1 | 6/2019 |
| DE | 102017222926 A1 | 6/2019 |
| DE | 102018214903 A1 | 3/2020 |
| DE | 102018216175 A1 | 3/2020 |
| JP | H09183989 A | 7/1997 |
| JP | 2017036709 A | 2/2017 |
| WO | 2015074148 A1 | 5/2015 |
| WO | 2015078962 A1 | 6/2015 |
| WO | 2017054888 A1 | 4/2017 |
| WO | 2018166603 A1 | 9/2018 |

* cited by examiner

*Primary Examiner* — Kevin A Lathers
(74) *Attorney, Agent, or Firm* — McCoy Russell LLP

(57) ABSTRACT

The invention relates to a system for supplying a gaseous fuel that comprises a low temperature tank for receiving the fuel in its liquid aggregate state achieved by cooling and comprises a rail that is fluidically connected to at least one injector device for discharging gaseous fuel into a combustion space. The system is characterized in that it has a pressure store that is configured to receive gaseous fuel and that is fluidically connectable to both the low temperature tank and the rail to buffer fuel coming from the low temperature tank and to supply it to the rail.

17 Claims, 2 Drawing Sheets

SYSTEM FOR SUPPLYING A GASEOUS FUEL

CROSS REFERENCE TO RELATED APPLICATION

The present application claims priority to Swiss Patent Application No. 00638/20 filed on May 28, 2020. The entire contents of the above-listed application is hereby incorporated by reference for all purposes.

TECHNICAL FIELD

The present invention relates to a system for supplying a gaseous fuel, in particular to a fuel injection system, and to an internal combustion engine, and to a vehicle that uses such a system.

BACKGROUND AND SUMMARY

The use of gaseous fuels will even become reality for long distance trucks and/or for mobile work machines due to legislative changes in the taxation of fuel and/or due to exhaust emission legislation. However, it could also be advantageous to use gaseous fuels for different reasons for maritime applications or on offshore systems. Among gaseous fuels, hydrogen, for example, provides the option of an almost climate neutral well to tank provision. Hydrogen can furthermore also be used in mobile fuel cell drives and thus in actually emission free (zero emission) vehicles. Hydrogen combustion engines offer the potential of being able to observe even strict exhaust gas limits solely by internal engine measures so that at least the exhaust aftertreatment system can be substantially reduced.

To the extent that the mobile use such as the deployment in a long distance truck or in a mobile work machine requires a comparatively long period of use between the refueling procedures, the use of hydrogen stored in liquid form can in particular be put forward. Even when considering that a low temperature liquid gas tank is required for the storage of liquid hydrogen, it has a higher volumetric energy density when also taking account of its external dimensions than gaseous hydrogen in a 700 bar pressure tank. The gravimetric energy density of hydrogen adsorption stores is too low and therefore also does not form the focus of future onroad or offroad applications. Cryogenic stores for hydrogen are extremely complex since they also have to demonstrate high demands with respect to pressure resistance beside the thermal demands. A storage of chemically bound hydrogen is also known in mobile systems. So that the hydrogen can be supplied to the energy converter, the hydrogen then has to be eliminated by a chemical reaction running in the vehicle.

In a liquid gas storage of gases that have a particularly low boiling temperature such as hydrogen (−252° C. at 1 bar), methane (−162° C. at 1 bar)—the main component of natural gas—the permanently occurring partial evaporation, the so-called boil-off, exerts a very great influence on the handling. This inter alia relates to the need for a very effective and thus complex thermal insulation. A heat input from the environment is nevertheless ultimately unavoidable, e.g. via the removal line leading out of the store. If comparatively high fuel gas amounts are moved from such a store appropriately called a low temperature liquid gas tank, a volume that becomes increasingly larger is available to the fuel gas portion, i.e. the boil-off gas, evaporating during the removal within the low temperature liquid gas tank. If, in contrast, no or only a very small fuel gas removal takes place, a pressure increase takes place within the low temperature liquid gas tank. After the reaching of a specific pressure level that is in an order of magnitude of 10 bar for hydrogen liquid gas tanks, for example, the amount of the boil-off hydrogen or respectively boil-off gas has to be discharged. This discharge that is unwanted from the viewpoint of cost and energy efficiency either leads to a total loss of this boil-off gas amount or requires an alternative use with the apparatus effort required for this.

So that a (complete) refueling of a low temperature liquid gas tank is possible at all, the boil-off gas remaining therein first has to be sucked out. To be able to supply it again to the provided utilization path or respectively the fuel or fuel gas path, this removed boil-off gas has to be correspondingly cooled and thus process energy has to be supplied again. This procedure furthermore requires an apparatus effort at the fueling device. The apparatus effort to take along such a system in a vehicle is not practical. Furthermore, the dimensions of such a system in a vehicle would also unduly greatly restrict the available usable space.

It is further disadvantageous in previously known implementations of hydrogen engines equipped with a common rail system that an immediate shutdown should/must be suppressed because the hydrogen would otherwise remain within the rail and the lines connected thereto, etc. under high pressure. Such a hydrogen engine is typically operated in the absence of a further hydrogen supply into the rail for so long until a pressure reduction in the rail has concluded. If the mechanical output power of the hydrogen engine arising in such an overshoot cannot be utilized, e.g. for charging a battery, it is e.g. reduced by an idling operation of the hydrogen engine or in a different manner. There is accordingly a further energy loss.

In summary, it accordingly applies that fuel gas amounts are produced in applications in which the fuel gas has to be supplied at high pressure and this fuel gas is obtained from a low temperature liquid gas tank that can no longer be supplied to the actually intended utilization path. They are inter alia a portion of the boil-off gas that can possibly then no longer be held in a low temperature liquid gas tank due to the limited pressure resistance and has to be discharged and the then remaining boil-off gas that can admittedly be held in the low temperature liquid gas tank, but has to be sucked off before the refueling, to provide a sufficient volume for the fuel gas to be refueled in liquid form.

The invention relates to a system for supplying a gaseous fuel, in particular to a fuel injection system, that is stored in a low temperature tank, in particular in a low temperature liquid gas tank, to provide fuel by which at least the loss of boil-off gas can be considerably reduced for an injection device, in particular for a fuel high pressure injection. In a particularly advantageous embodiment of the invention, at least a significant portion of the boil-off gas can even be supplied to the actually intended utilization path.

The implementation of the invention is in particular economically sensible for the storage of gases that have a low boiling point. (The invention is in particular economically very sensible for the storage of hydrogen since its boiling point is extremely low at −252° C. (at 1 bar). A use for liquefied natural gas (LNG)) also appears economically sensible since natural gas likewise has a low boiling point that is a little below −160° C. (at 1 bar).).

The problems listed above are overcome or at least alleviated by a system that has the features of independent claim 1. Further advantageous embodiments are presented in the dependent claims here.

The invention further relates to a system for supplying a gaseous fuel, in particular to a fuel injection system, that comprises the low temperature tank, in particular a low temperature liquid gas tank for receiving the fuel in its liquid aggregate state achieved by cooling and comprises a rail that is configured with at least one injector device for discharging fuel gas into a respective combustion space. The system is characterized in that it further has a pressure store that is configured for receiving gaseous fuel that is fluidically connected both the low temperature tank preferably designed as a low temperature liquid gas tank and to the rail to buffer gaseous fuel coming from the low temperature tank or respectively fuel gas coming from it and to supply it to said rail.

Since the invention can be particularly advantageously used for low temperature liquid gas tanks in accordance with the current prior art in the low temperature storage of gases, which will be explained in the following text, the term low temperature liquid gas tank will be used in the following. It may not be concluded from this that systems in accordance with the invention are restricted to those that include a low temperature tank that can be associated with the category of low temperature liquid gas tanks.

It is clear to the skilled person that any channel-like line can represent a rail. In addition, only one injector device has to lead off from the rail and it is not necessary for a plurality of injector devices to be connected to the rail. The case is thus also covered by the present invention that any injector device that is suitable for discharging gaseous fuel into a combustion space cooperates with exactly one rail.

Due to the provision of the pressure store, the amount of boil-off gas that is discharged in an ultimately energetically unused manner into the atmosphere after disposal, i.e. after a corresponding chemical conversion, or has to be forcibly converted in a fuel cell at a specific point in time even though there is not sufficient demand for the energy released therefrom can be greatly reduced or can be almost completely avoided with a configuration dimensioned as correspondingly large. This fuel gas portion can be taken up by the pressure store from the low temperature liquid gas tank, for example, by removal of liquid gas and the conversion during its discharge into the gaseous aggregate state so that the inner pressure in the low temperature liquid gas tank can be lowered or can be maintained at a present pressure level and a discharge of boil-off gas does not initially have to take place. Additionally or alternatively, it is, however, also conceivable that boil-off gas, that is fuel gas, that has already transitioned from its liquid aggregate state into the gaseous aggregate state in the tank interior of the low temperature liquid gas tank is led into the pressure store to hold it ready there for a later use in the internal combustion engine. It is thereby likewise possible to lower the pressure in the low temperature liquid gas tank or to maintain a present pressure level.

Provision can be made in this respect that the pressure store has a pressure resistance of at least 300 bar, preferably of at least 400 bar, and more preferably of at least 500 bar. With respect to the capability of the pressure store, gaseous fuel can be received therein up to the reaching of a sufficiently high pressure level.

Provision can furthermore be made in accordance with the invention that the system has a further fluid line that fluidically connects the low temperature liquid gas tank and the rail to one another while bypassing the pressure store to lead fuel gas into the rail.

Provision can therefore accordingly be made with the further fluid line that a fuel gas supply is selectively possible into the pressure store or into the rail, with this being able to be adapted to the current fuel gas demand.

Provision can be made in accordance with an optional modification of the invention that the further fluid line is connected to a pump, in particular to a cryopump, that is configured to convey liquid gas, i.e. fuel gas still in its liquid aggregate state, from the low temperature liquid gas tank and in so doing to allow it to transition into its gaseous aggregate state. The pump mechanism of this pump is preferably integrated in the low temperature liquid gas tank. Alternatively or in addition, the conversion of the fuel removed from the low temperature liquid gas tank in liquid form into the gaseous aggregate state preferably takes place within the pump, i.e. the pump mechanism and the device for the actual heat input into the fuel are preferably in a common housing. Alternatively or in addition, the pump drive for driving the pump mechanism is preferably outside the pump and particularly preferably outside the low temperature liquid gas tank. This pump is preferably configured as a cryopump so that the term cryopump will be used in the following, which should, however, by no means mean that the invention is restricted to this extent.

The pressure store or the valve can thus, for example, be connected to the outlet of the cryopump, with a direct connection from the cryopump to the rail, however, also additionally being able to be provided.

In this respect, a valve can also be provided that is configured to lead fuel gas coming from the low temperature liquid gas tank and changed to its gaseous aggregate state to the pressure store or to lead it into the rail by means of the further fluid line while bypassing the pressure store.

In addition, in accordance with a further development of the invention, a boil-off valve in fluid communication with the low temperature liquid gas tank can be provided for discharging boil-off gas from the low temperature liquid gas tank. As the skilled person is aware, the term boil-off gas is understood as gas or respectively fuel gas that has been introduced into the low temperature liquid gas tank in the form of liquid gas on refueling and that has already transitioned into the gaseous aggregate state, i.e. has evaporated, in the interior of the low temperature liquid gas tank through the internal increase of internal energy due to the heat input that can never be completely avoided. As is known, the evaporation of a completed (isochoric) gas amount results in a pressure increase. The inner pressure in the low temperature liquid gas tank can be kept within the permitted limit values by this targeted discharge of boil-off gas.

Provision can furthermore be made in this respect that a compressor is arranged downstream of the boil-off valve whose upper pressure side is fluidically connected to the pressure store to be able to compress the boil-off gas removed via the boil-off valve to a correspondingly high pressure level so that it can be supplied to the pressure store.

Provision can therefore accordingly be made that the discharged boil-off gas is further compressed by a compressor to use it in accordance with its original purpose after a buffering in the pressure store, that is to supply it to the rail where it is introduced into a combustion space via at least one injector device. The efficiency of the fuel utilization is thus also further increased since now a higher proportion of the fuel gas filled into the low temperature liquid gas tank in liquid form can be provided for its intended use purpose.

Provision can furthermore be made that a fuel cell is arranged downstream of the boil-off valve to convert the gaseous fuel into electrical energy, with a battery preferably being provided to buffer the electrical energy generated in this process. Such a kind of energy recovery is, however, also only possible when the fuel gas quality satisfies the demands of the fuel cell. As is known, the required fuel gas qualities for fuel cells are at times considerably higher than for internal combustion engines. Such a type of energy recovery furthermore requires a comparatively high apparatus effort.

Under these conditions, it can further be prevented, for example when further boil-off gas can no longer be held in the pressure store, that said boil-off gas has to be discharged in an unused manner to the atmosphere (preferably via a catalytic converter rendering the gas harmless).

Provision can be made in accordance with a further modification of the invention that the rail is fluidically connected to a suction side of the compressor to supply fuel gas not required in the rail to the pressure store. This connection can be made via a valve that allows a fluid connection or not depending on the valve position.

Gas that has remained in the rail on the end of an injection procedure can thus be introduced into the pressure store via the compressor, which is in particular sensible on a shut-down demand on the internal combustion engine or on an emergency shutdown.

Provision can furthermore be made in accordance with the invention that on the presence of a fuel cell, a fluid connection to the rail can be provided to supply fuel gas not required in the rail to the fuel cell.

Provision can be made in accordance with a further modification of the invention that the system furthermore comprises a pressure store discharge valve for the selective discharging of fuel gas contained in the pressure store to the rail. The demand for a discharge of the fuel gas contained in the pressure store to the rail can thus be exactly controlled or regulated.

Provision can furthermore be made in accordance with the invention that the system furthermore comprises a gas pressure adjustment unit arranged upstream of the rail to set the pressure level of fuel that comes from the low temperature liquid gas tank, that has transitioned into the gaseous aggregate state, and that flows into the rail, with the gas pressure adjustment unit preferably being respectively separately connected to the pressure store and to the low temperature liquid gas tank.

An inflow valve for introducing fuel into the low temperature liquid gas tank is preferably provided that is in fluid communication with the low temperature liquid gas tank.

In addition, in accordance with the invention, the low temperature liquid gas tank can be configured with multiple walls to particularly effectively thermally insulate a tank content.

Provision can be made in accordance with the invention that the low temperature liquid gas tank is configured to be able to withstand an inner tank pressure of at least 6 bar, preferably of at least 8 bar, but only to be able to withstand a maximum inner tank pressure of up to 16 bar, preferably up to 12 bar, more preferably up to 10 bar. This produces high cost savings of the low temperature liquid gas tank that result in an overcompensation of the additional costs for the additional components and elements that are necessary for a system in accordance with the invention.

A feature is common to the low temperature liquid gas tank and a cryotank that both are very well thermally insulated. Unlike a cryotank, a low temperature liquid gas tank has a comparatively low pressure resistance that is in the above-named order of magnitude for hydrogen. The pressure resistance of a cryotank is at least 50 bar in contrast. Since a cryotank simultaneously satisfies the demand of extremely good thermal insulation and high pressure resistance, it is extremely expensive.

The skilled person is aware that hydrogen cryotanks can have a pressure resistance up to an order of magnitude of 1000 bar. If a cryotank were used in a system in accordance with the invention, boil-off gas could then also be supplied to the intended usage path when the boil-off gas in the cryotank has a pressure level that is lower than the target rail pressure value. At least the amount of the boil-off gas to be sucked out before a refueling could be reduced in this manner, which admittedly only represents a small advantage. If, however, a cryotank only has a pressure resistance of, for example, 50 bar that is comparatively inexpensive, the use of such a cryotank in a system in accordance with the invention is then definitely very advantageous in comparison with a use in accordance with the prior art of such a cryotank.

The invention additionally relates to an vehicle, in particular to a mobile work machine, having a fuel injection system in accordance with one of the preceding variants.

BRIEF DESCRIPTION OF THE FIGURES

Further advantages, features, and details of the present invention will become clear on the basis of the following description of the Figures. There are shown.

DETAILED DESCRIPTION

Figure 1:
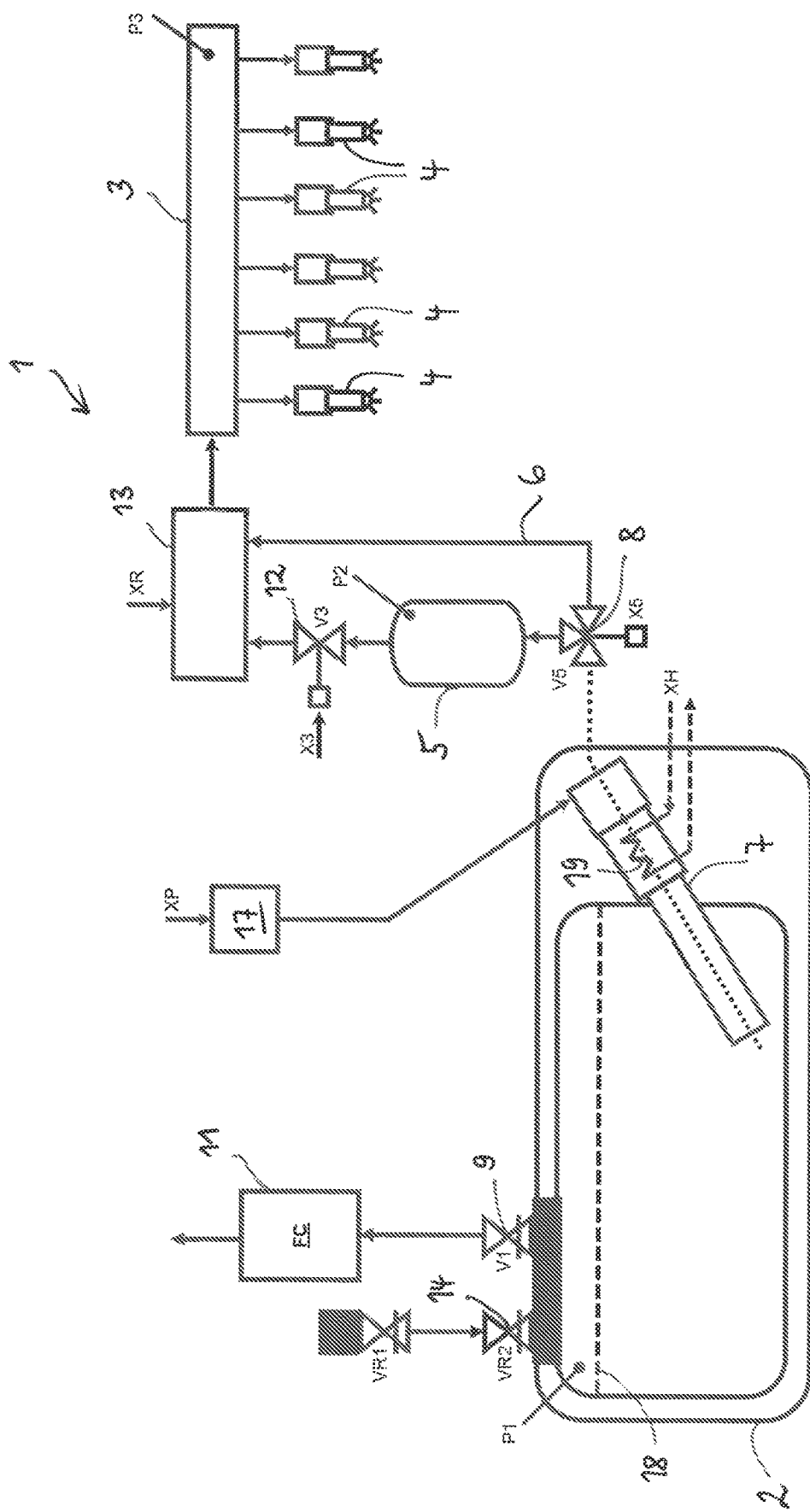
FIG. 1: a schematic representation of an embodiment of the present invention.

FIG. 1 shows a first embodiment of the present invention. FIG. 1 shows a fuel path starting from a low temperature liquid gas tank 2 up to the fuel high pressure injection by the plurality of injection devices 4. Such a fuel injection system can be used for hydrogen or for natural gas, for example.

The general active principle is here based on a removal of fuel gas (fuel) from the low temperature liquid gas tank 2 or via the pump 7, that can in particular be designed as a cryopump 7, whose pressure level is raised on the removal or downstream thereof such that it can be introduced via a fluid line (for example the fluid line 6) into a rail 3 from where an injection into a combustion space of an internal combustion engine can take place via an injector device 4.

The inner volume of the low temperature liquid gas tank 2 is generally divided into two regions, which is indicated by the dashed line 18. The proportion of the fuel gas present as liquid gas occupies the volume below the dashed line 18 and already evaporated fuel gas, so-called boil-off gas, Is located in the residual volume disposed above it. A small portion of the fuel gas supplied as liquid gas is already in the gaseous aggregate state directly after a refueling of a low temperature liquid gas tank 2 with a liquid gas. On a refueling of a low temperature liquid gas tank 2, its total capacity usable in principle is therefore not filled with liquid gas. The inner temperature for the application example of hydrogen directly after a refueling of a low temperature liquid gas tank 2 typical for mobile applications typically amounts to approximately minus 250° C. and the inner pressure already has a pressure level of approximately 4 bar.

The heat input into the low temperature liquid gas tank 2 that is never completely avoidable effects an evaporation of liquid gas, i.e. a boil-off. The heat input furthermore naturally also results in a certain increase of the inner temperature of the low temperature liquid gas tank.

As soon as the amount of the boil-off gas already present in the low temperature liquid gas tank 2 has resulted in the reaching of a specific pressure level, the amount above said amount has to be discharged and in accordance with the prior art, this boil-off gas can no longer be supplied to its original purpose. An extremely effective thermal insulation of the low temperature liquid gas tank 2 is therefore of fundamental importance.

Since the boil-off gas may not be discharged to the environment in non-consumed form for safety reasons and for environmental protection reasons, the discharge of boil-off gas in the prior art not only signifies an energy loss, but also requires an additional apparatus effort for its disposal. As already explained, this is used when the pressure level in the low temperature liquid gas tank 2 has reached a specific pressure value disposed a little below its maximum pressure resistance.

Devices are in particular used, for example, in fueling systems for mobile applications for storing liquid hydrogen in which the boil-off hydrogen that cannot be held in the low temperature liquid gas tank is conducted through a suitable catalytic converter to ensure the combustion preferably without forming a flame and already at comparatively low environmental temperatures. It is disadvantageous with such a procedure that such a device consumes the boil-off gas in a completely unused form.

The utilization of the boil-off gas to be discharged via a fuel cell 11 and a storage of the electrical energy thereby generated in a battery or also a direct use of this electrical energy are therefore advantageous from an energetic aspect. If the direct further use of the electrical power produced by the fuel cell 11 cannot be coordinated in time with the discharge of the boil-off gas, this type of conversion of the boil-off gas requires an electrical energy store, for example in the form of a battery. However, the apparatus effort for such an energy recovery is again higher than a simple disposal device. The use of the combustion gas furthermore requires a gas quality or a purity that is considerably higher than for the use in an internal combustion energy.

The boil-off gas moves into the fuel cell 11 via the boil-off valve 9 that acts as a relief valve and that is preferably arranged at a region of the low temperature liquid gas tank 2 at which boil-off gas collects. The boil-off gas that cannot have a pressure above approximately 10 bar due to the properties of the low temperature liquid gas tank 2 is not directly usable for such applications in which a highly pressurized gas is necessary such as a direct injection into an internal combustion engine.

A cryopump 7 that is particularly preferably integrated in the low temperature liquid gas tank 2 is more preferably provided for a metered fuel gas removal from the low temperature liquid gas tank 2. A sucking in and compression of the fuel gas present in liquid form takes place first in this process. On the conveying from the low temperature liquid gas tank 2, a transition into the gaseous aggregate state then takes place. A meterable heat action on the fuel gas initially present in liquid form preferably takes place within the internal gas conveying path of the cryopump 7 via a heating device 19, for example in the form of a heat exchanger. In cooperation with the pump mechanism that is contained in the cryopump and that can be variably driven via an external pump drive 17, which in turn enables a fuel gas removal from the low temperature liquid gas tank 2 in line with requirements. Particular attention has to be paid on the integration of the cryopump 7 into the low temperature liquid gas tank 2 to a good thermal insulation of the following three passage points of the cryopump 7:

a) the fluid communication via which the fuel is guided to the outside from the interior of the low temperature liquid gas tank 2;

b) the power supply to the pump mechanism of the cryopump 7 or to the coupling of the component driving the pump mechanism; and c) the connection required for the supply of thermal energy.

In the embodiment, the cryopump 7 is integrated in the low temperature liquid gas tank 2. An external installation of the pump drive 17 therefore avoids an input of its loss heat to the low temperature liquid gas tank 2.

Provision can furthermore be made that the cryopump 2 integrated in the low temperature liquid gas tank 2 is configured to discharge the fuel gas conveyed by it at a pressure level of a few hundred bar, whereby the fuel gas can already be supplied without any further compression to a high pressure application, in particular to a fuel/fuel gas high pressure injection in an internal combustion engine. A high energy portion that previously had to be used for the liquefaction of the fuel gas so that it was able to be supplied in liquid form to the low temperature liquid gas tank 2 is hereby used such that the fuel gas removed from the low temperature liquid gas tank 2 via the cryopump 7 and evaporated is already highly compressed.

Such an arrangement in which the actual cryopump 7—i.e. the pump mechanism and the heat input required to trigger the evaporation—is located outside the low temperature liquid gas tank 2 is simpler in handling from a technical insulation aspect and is likewise covered by the invention. Such an arrangement is described, for example, in WO 2015/078962 A1. However, a fuel gas provided in this manner has a much lower pressure level that may still be sufficient for a suction pipe injection, but has too low a pressure for a direct injection or respectively a fuel high pressure injection.

The energy required starting from the low temperature liquid gas tank 2 for the conditioning of the fuel gas for use as a fuel In an internal combustion engine is not insubstantial and is made up of the energy supply of the pump mechanism and the heating of the liquid gas in the fuel path. In the application example of liquid hydrogen, starting from approximately −250° C., a temperature rise to 0° C. to 25° C. is necessary. The energy requirement necessary for this temperature rise can be covered in an internal combustion engine provided that the fuel injection system 1 in accordance with the invention by the removal of thermal energy from the engine cooling water.

In a simple embodiment, the power supply to the pump mechanism of the cryopump 7 and the heat supply by the heating device 19 into the fuel gas conveyed by the cryopump 7 are determined in dependence on a rail pressure P3 and on a measured temperature value detected at the outlet of the cryopump 7.

A suitable rail 3 for a 6 cylinder hydrogen engine having a total cubic capacity of approximately 12 liters and a maximum power of approximately 400 kW has an inner volume between 1.5 and 2.5 liters. The rail pressure P3 is typically at 300 bar. The rail 3 may not remain filled with the highly pressurized fuel gas with a shutdown internal combustion engine for safety reasons. Provision can thus be made that on a desired shutting down of the internal combustion engine, the fuel gas supply is first deactivated, whereas the internal combustion engine is operated further for so long until a sufficient pressure drop in the rail 3 is present.

So that the refueling of a low temperature liquid gas tank 2 is possible at all, the boil-off gas located therein first has to be sucked out. After its sucking out, it can naturally again be supplied to a low temperature liquid gas tank 2, but first has to be liquefied again.

Instead of a single connection from the low temperature liquid gas tank 2 to the rail 3 via the fluid line 6, the embodiment in accordance with the invention has a parallel path in which a pressure store 5 is integrated. A gas connection from the outlet of the cryopump 7 to the rail 3 via a valve 8 can be created via the fluid line 6 and/or via a path that is arranged in parallel with the fluid line 6 and that has the pressure store 5. Provision can thus be made that both sections extending in parallel with one another are led to an inlet of a gas pressure adjustment unit 13. Provision can also be made that the gas connection to the pressure store 5 is interrupted when the gas connection via the fluid line 6 Is active and vice versa. In a further valve position of the valve 8, a gas connection can thus be present from the outlet of the cryopump 7 to the pressure store 5, whereas the gas connection to the gas pressure adjustment unit 13 is interrupted. In an optional further valve position, the gas connections via the two gas paths arranged in parallel toward the gas pressure adjustment unit 13 is interrupted.

If in a first application scenario the gas consumption and thus the gas removal via the cryopump 7 is so high that the capacity becoming free in the low temperature liquid gas tank 2 (recognizable by a dropping of the dashed line 18) that is available for holding the boil-off gas is sufficiently large, the valve 8 is at least permanently in that valve position in which the fuel gas is conducted over the further fluid line 6 when fuel gas is supplied to the rail 3 and is preferably never in the position in which fuel gas is led into the pressure store 5. The valve 8 preferably constantly blocks the gas line that leads to the pressure store 5 and that is not present in the prior art.

Provided that no gas removal at all takes place from the low temperature liquid gas tank 2 via the cryopump 7 in a second application scenario because, for example, the application has been stopped or the internal combustion engine has been shut down, the capacity of the low temperature liquid gas tank 2 to hold further boil-off gas is exhausted after a certain time at a certain internal pressure caused by the design or permitted from a technical safety aspect. The valve 8 is then at the latest moved to that valve position in which an inflow of fuel gas coming from the low temperature liquid gas tank 2 into the pressure store 5 is possible and the cryopump 7 activates. Fuel gas in liquid form is accordingly removed from the low temperature liquid gas tank 2 and is supplied to the pressure store 5 in gaseous form. The volume in the low temperature liquid gas tank 2 that can be taken up by boil-off gas is thereby increased, which is equivalent to a capacity increase for the storage of boil-off gas and there is initially a drop of the inner pressure in the low temperature liquid gas tank 2.

In this process, the cryopump 7 is preferably operated in a coordinated manner such that only exactly that amount of liquid gas is removed to continuously exactly maintain the capacity in the low temperature liquid gas tank 2 that is required to be able to continue to maintain the increasing amount of boil-off gas that arises, for example, due to an unavoidable heat input. This measure can now be maintained for so long until the permitted maximum pressure or the maximum pressure that can be provided by the cryopump 7 has been reached in the pressure store 5. After the reaching of the maximum pressure that is decisive for the limitation and that can be more than 300 bar, the amount of the subsequently produced boil-off gas that cannot be held in the low temperature liquid gas tank 2 has to be discharged via the boil-off valve 9.

Alternatively to a continuous removal of fuel gas from the low temperature liquid gas tank 2 in liquid form by means of the cryopump 7, a pulsed conveying via it can also be provided.

In a third application scenario, a certain amount of boil-off gas is already present in the pressure store 5. A certain free capacity is furthermore present for the holding of boil-off gas in the low temperature liquid gas tank 2.

If the pressure level of the boil-off gas contained in the pressure store 5 is sufficiently high for the supply of the intended process that in the presented application example is the direct injection of fuel gas into an internal combustion engine, the boil-off gas is preferably obtained from the pressure store 5, whereas the fuel gas present in the low temperature liquid gas tank 2 in liquid form is saved for a later use. In the presented application example of a direct injection of fuel gas for high pressure injection at a target rail pressure value of 300 bar, a minimum pressure of 300 bar plus a certain reserve (see below) has to be present in the pressure store 5 so that the application can be operated with fuel gas from the pressure store 5.

In the event of an already higher pressure level in the pressure store 5, the application can naturally only be operated from this store for so long until the pressure there has dropped to a threshold value that corresponds to the target rail pressure value plus a certain reserve.

This threshold value is a little above the pressure level required to carry out the application. The threshold value could be held at 320 bar with respect to the application example. This can be explained by the assumption that a certain reserve, that is set at 20 bar here, is required to be able to provide the target rail pressure value of 300 bar with a correspondingly acceptable safety margin since a certain pressure drop is unavoidable along the gas connection, certain pressure fluctuations can occur, and a certain reserve may be necessary at the gas pressure adjustment unit 13 so that a sufficiently exact observation of the target rail pressure value is possible.

It is thus clear that a certain amount of fuel gas that cannot be directly used always remains in the pressure store 5. This gas amount is, however, not be equated with a gas loss because, after a further inflow of fuel gas, the gas amount previously no longer suppliable to the intended process can subsequently indeed by used by it. This is rather comparable with a base amount of fuel gas that remains in the pressure store 5. Once the threshold pressure of, for example, 320 bar has been exceeded, the complete gas amount that corresponds to the fuel gas subsequently flowing into the pressure store 5 can be directly supplied to its actually intended use. This base then always remains at a pressure level of this threshold pressure. So that a non-negligible gas amount can be stored at such a comparatively high threshold pressure and can be supplied to its use, the use of a pressure store having a comparatively high pressure resistance of, for example, at least 350 bar is recommended. The same naturally correspondingly applies to the outlet pressure the used cryopump 7 or a compressor (not shown) connected downstream of the cryopump 7 can build up.

If the process to be supplied with the gas or respectively fuel gas requires a considerably smaller pressure level, for example the fuel supply of an internal combustion engine having suction pipe injection, the threshold value or respectively the base is considerably smaller and is at an order of magnitude of some ten bar. A pressure store 5 and a cryopump 7 could be used here with a respectively substantially lower rated pressure.

Provision can be made on an operation of the device in accordance with the invention that substantially higher gas pressures are present in the pressure store 5 than the gas pressure that is intended for this purpose and that is required for the intended application. In the application example of the gas supply for a rail 3, the fuel gas has to be supplied at an exactly defined pressure and any exceeding of the pressure should be suppressed. The use of a gas pressure adjustment unit 13 can therefore be sensible that serves as an actuator of a regulation or control. A pressure store outlet valve 12 is preferably used so that the fluid communication between the pressure store 5 and the gas pressure adjustment unit 13 can be opened or interrupted. Alternatively or in addition, a pressure limiter (not drawn) is preferably present along the fluid communication between the pressure store 5 and the gas pressure adjustment unit 13. If present, the pressure store outlet valve 12 and the pressure limiter are each preferably located in the direct vicinity of the outlet of the pressure store 5.

A pressure limiter is preferably used for the application example whose outlet pressure can be manually set to a fixedly settable value or optionally by a remote action.

The gas pressure adjustment unit 13 is preferably arranged in direct proximity to the rail 3 so that the respective fluid communication can be as short as possible so that the time periods required for the counteracting of pressure fluctuations in the rail 3 are shortened, which in turn provides a better option for suppressing pressure fluctuations in the rail 3, i.e. exactly where the pressure should be kept as close as possible to its target value.

A great advantage of the separation of the division of work between the pressure limitation (by the pressure limiter) and the setting of the rail pressure taking place downstream thereof (by the gas pressure adjustment unit 13) is that the pressure limiter per se has to be able to record a large pressure drop, whereas the gas pressure adjustment unit 13 requires a high precision and fast dynamics to set the rail pressure. If a pressure limiter and a gas pressure unit 13 for setting the rail pressure P3 are present as two separate construction units, there is no need for the outlet pressure of the pressure limitation 12 to exactly observe a certain target value.

As can be recognized, the embodiment provides for a use of the gas pressure adjustment unit 13 for setting the rail pressure P3 in the event of a direct gas supply from the low temperature liquid gas tank 2 to the rail 3. Optionally, a pressure balancing unit (not shown) can be provided between the outlet of the valve 8 drawn at the right side in the diagram and the inlet of the gas pressure adjustment unit 13.

So that a sufficiently high fuel gas pressure level can be built up in the pressure store 5 for the later supply of the internal combustion engine, a gas supply of at least 350 bar should be possible, preferably a pressure level of at least 400 bar. If the cryopump 7 that is present cannot provide a sufficiently high pressure level, it is possible via a single stage or multi stage compression (not shown) connected downstream of the cryopump 7.

In a preferred variant, the second compression stage can be located between the valve 8 and the pressure store 5. A cryopump 7 is then sufficient that can output an outlet pressure of 320 bar with respect to the numerical example introduced above.

In a further particularly preferably preferred variant, a second compression stage is located upstream of the valve 8. A cryopump 7 can then be used whose maximum outlet pressure is smaller than 320 bar.

It can thus be achieved by the invention that boil of gas can be supplied to its original use.

However, the embodiment of the invention described up to now has additional improvement potential, which will be explained in the following for the example of hydrogen.

It is clear to the skilled person that the influence of a relative temperature change on the density of the liquid hydrogen is substantially smaller in the temperature range and pressure range relevant for the storage of liquid hydrogen than the influence of a relative pressure change; however, under the condition that the pressure change is not decisive for a change of the aggregate state. An extremely great reduction of the density is produced on a phase transition from the liquid to the gaseous aggregate state.

The liquid hydrogen contained in the low temperature liquid gas tank 2, for example, has a density at a temperature of $-250°$ C. and at a pressure level of 10 bar of just 70 g/l. If the internal temperature has risen to $-242°$ C. during the heat input, the density of the remaining liquid hydrogen is still at just 50 g/l. Due to the highly effective thermal insulation of the low temperature liquid gas tank 2, the life for such aa temperature increase is relatively long and is around two weeks provided that no hydrogen discharge takes place—except for the discharge of boil-off hydrogen that becomes necessary.

The boil-off hydrogen and thus gaseous hydrogen present in the low temperature liquid gas tank 2 under the same environmental conditions has a density of approximately 14 g/l that is smaller than that of liquid hydrogen by a factor of approximately 3.5.

In the embodiment of the invention described with reference to FIG. 1, an amount of approximately 3-5 grams of hydrogen accordingly has to be removed to enable a residue of approximately one gram of boil-off hydrogen in the low temperature liquid gas tank 2 since only a removal of liquid hydrogen is possible in the embodiment of the invention shown in FIG. 1. This means overall that a comparatively high amount of liquid hydrogen has to be removed from the low temperature liquid gas tank 2 for the maintaining of a certain quantity of boil-off hydrogen therein and accordingly a comparatively high amount of gaseous hydrogen has to be buffered in the pressure store 5 if the removed liquid hydrogen is not obtained from the internal combustion engine.

Qualitatively the same relationship also applies to other gases or fuel gases that have a very low boiling temperature such as natural gas.

Figure 2:
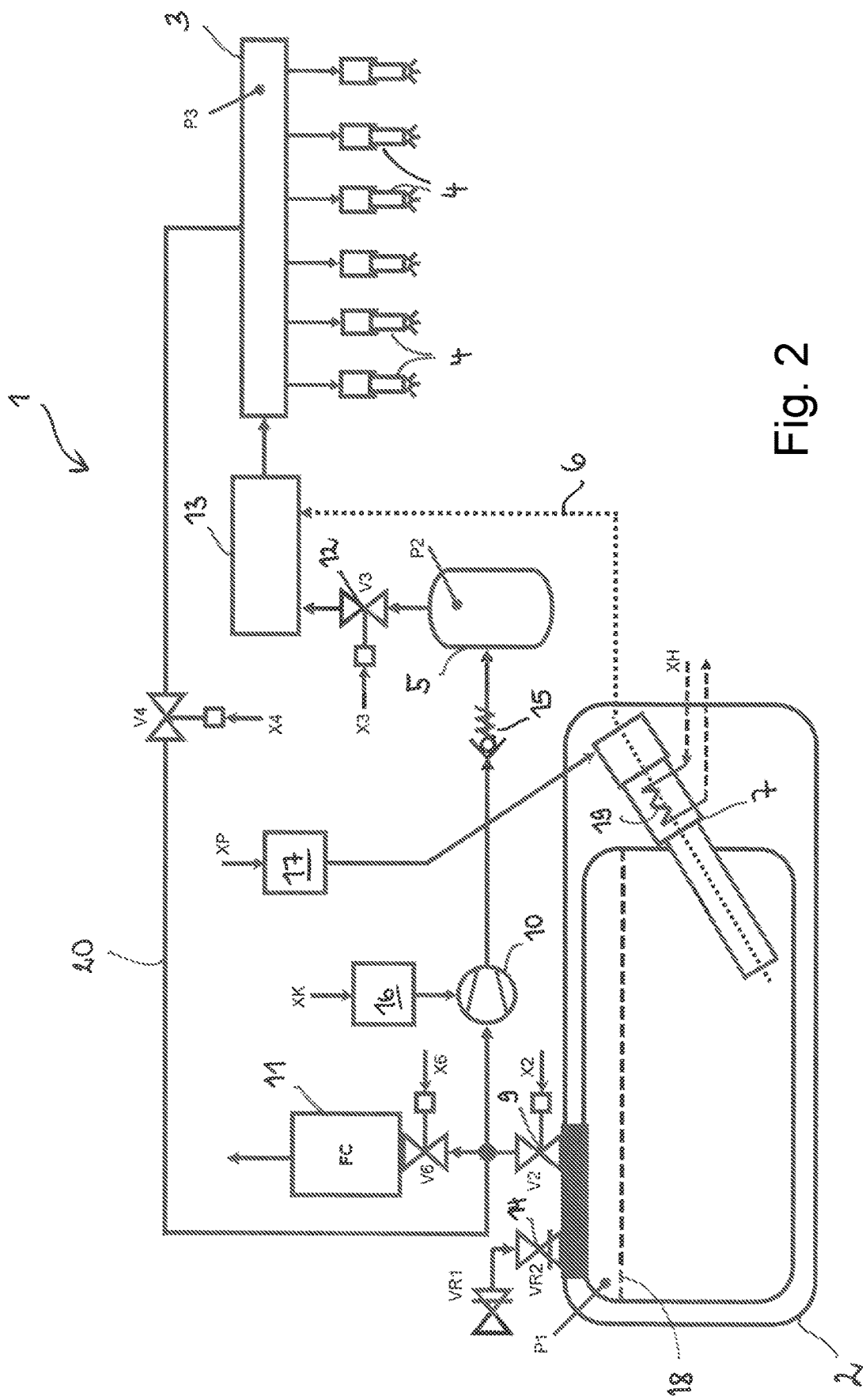
FIG. 2: a schematic representation of a further embodiment of the present invention.

FIG. 2 shows a second embodiment of the invention in which a pressure store 5 is also included that, however, can here obtain boil-off gas from the low temperature liquid gas tank 2 via a compressor 10 provided that the boil-off valve 9 is open.

The discharge of boil-off gas from the low temperature liquid gas tank 2 is possible with the embodiment shown in FIG. 2 and said boil-off gas 2 can be supplied to its intended use, namely the use for a fuel gas high pressure injection into an internal combustion engine even though the boil-off gas present in the low temperature liquid gas tank 2 has much too low a pressure level for this purpose.

Gaseous fuel is removed from the low temperature liquid gas tank 2 via the boil-off valve 9 and is supplied to a compressor 10 that provides a raising of the pressure level. The high pressure side of the compressor 10 is connected to the pressure store 5 so that a possibility for buffering gaseous fuel or respectively fuel gas is present that can be supplied to the rail as required under the condition of sufficiently high a pressure level. It is of advantage here that—unlike in the embodiment described in FIG. 1—liquid gas can now no longer be removed from the low temperature liquid gas tank 2 to achieve an additional capacity for the holding of boil-off gas therein, but this additional capacity is rather provided by a removal of boil-off gas that is supplied to the pressure store 5 via the compressor 10. When the pressure resistance of the liquid gas store 2 is reached—unlike with the embodiment shown in FIG. 1—for the further holding of a subsequently produced quantity of boil-off gas, a multiple amount of this quantity accordingly no longer has to be removed from the low temperature liquid gas tank 2.

The boil-off valve 9 is located in a preferred embodiment of the low temperature liquid gas tank 2 in a region that is already free of liquid gas on a refueling and directly thereafter. In particular when a use is provided in an onroad vehicle or in an offroad vehicle, this region can be designed as a bulge of the low temperature liquid gas tank 2 that is led away from the tank interior and that is sufficiently high so that no liquid gas moves to the removal point in the form of the boil-off valve 9 even when cornering and/or in slanted positions. The boil-off valve 9 is preferably an electrically controllable two-stage valve that only enables a flow out of the low temperature liquid gas tank 2 and blocks a flow in the opposite direction.

The boil-off valve 9 particularly preferably opens independently as soon as the inner pressure in the low temperature liquid gas tank 2 exceeds a certain pressure threshold value and remains open for so long until a second certain pressure threshold value has been fallen below. Alternatively or additionally, the pressure limitation can also take place in a relief valve connected in parallel with the boil-off valve 9.

In a first variant of the second embodiment of the invention, the branch that is arranged above the boil-off valve 9 and that is shown in a schematic illustration as a knot and is not shown as a four point knot as in FIG. 2, but only shows the meeting of three lines. The gas supply to the branch can take place exclusively via the open boil-off valve 9. There are fluid connections from this branch to the low pressure side of a compressor 10 and to the inlet of a valve V6 that satisfies a passive pressure limitation function in a minimal configuration. The fluid return line 20 drawn in FIG. 2—i.e. a branch of four lines or a four point knot from the view of a schematic illustration—that connects the rail 3 to the suction side of the compressor 10, only optionally.

If boil-off gas is discharged from the low temperature liquid gas tank 2 via the boil-off valve 9 and if the compressor 10 not only provides a compression for forwarding into the pressure store 5, the relief valve V6 opens. In this case, a use of the boil-off gas by means of the fuel cell 11 or a disposal via the catalytic converter takes place.

It is not necessary that the drawn fuel cell 11 is present. Purely technically, a direct discharge of the boil-off gas to the environment would naturally also be possible. Against the background of better environmental compatibility and the safety aspect, the forwarding of the boil-off gas that has to be forcibly led off through a catalytic converter can be provided, which results in a combustion of the boil-off gas without a flame developing on a corresponding configuration. Such a catalytic converter would be arranged exactly like the fuel cell 11 with respect to the schematic illustration.

In this respect, the boil-off valve 9 can also already be opened in a remotely controlled manner (via control signal X2) at a pressure of the boil-off gas that is below the pressure threshold value at which an automatic opening takes place. Provision can accordingly be made to operate the compressor 10 to remove boil-off gas from the low temperature liquid gas tank 2 and to correspondingly compress it, whereby it is supplied to the pressure store 5. A premature removal of boil-off gas from the low temperature liquid gas tank 2, i.e. a discharge of boil-off gas below its permitted pressure resistance to effect this only one buffering in the pressure store 5 is, however, disadvantageous—except for specific exceptions (see below)—because it results in a faster heating of the inner temperature of the low temperature liquid gas tank 2 (see below).

Such an exception may be present if at least some of the boil-off gas remaining in the low temperature liquid gas tank 2 in the refueling process is supplied to the pressure store 5 by means of the compressor 10 and a possibly remaining portion that can/should no longer be supplied to the pressure store 5 is sucked off by the refueling device so that the total capacity of the low temperature liquid gas tank 2 can be used for the refueling of liquid gas. If it is clear that a larger consumption of fuel gas will be present directly after the refueling process, such a procedure provides the advantage that the fuel gas amount to be sucked off by the refueling device is smaller and thus at least some of the boil-off gas can remain in the system in accordance with the invention and can be supplied to the actually provided use path in this process.

If the fuel cell 11 is present and can serve the supply of electrified secondary consumers, the discharge of boil-off gas can also be sensible when the inner pressure of the low temperature liquid gas tank 2 is below or even far below its permitted pressure resistance, in particular when electrical power is required.

The leading off of boil-off gas from the low temperature liquid gas tank 2 for pressure relief there into the pressure store 5 can take place via a pulsed or also continuous operation of the compressor 10 that can be controlled in pulsed operation in a simple embodiment along a two-point pressure characteristic line. This means that on the reaching of an upper inner threshold value in the low temperature liquid gas tank 2, a certain proportion of the boil-off gas present therein is supplied to the pressure store 5 until a fixed shutdown criterion has been satisfied, whereby the closing of the boil-off valve 9 and a shutdown of the compressor 10 are triggered. The shutdown criterion can be dependent on the inner pressure of the low temperature liquid gas tank 2. The shutdown criterion is preferably dependent on the inner pressure P2 in the pressure store 5. The shutdown criterion can furthermore be dependent on a certain minimum pressure in the low temperature liquid gas tank 2.

This embodiment enables different ways for the fuel gas supply of an internal combustion engine, namely a gas removal from the pressure store 5 without an immediate refilling of the boil-off boil of gas from the low temperature liquid gas tank 2, a gas removal from the pressure store 5, a gas removal from the pressure store 5 with an immediate refilling with boil-off gas from the low temperature liquid gas tank 2, and a removal of liquid gas via the cryopump 7 and the further fluid line 6.

To minimize the gas portion that cannot be supplied to the actually intended purpose—in the application example the high pressure injection for an internal combustion engine—the preferred operating strategy corresponds to the already recorded order of these three possibilities.

As long as the rail pressure P3 can be covered by boil-off gas that is already present in the pressure store 5 this usable store of fuel gas already present in the pressure store 5 should first be removed. In this respect, a removal of boil-off gas from the low temperature liquid gas tank 2 should only be carried out when the pressure P2 in the pressure store 5 has a threshold value that is just above the pressure level that is necessary to cover the target rail pressure 3.

This operating strategy is sensible since the (volumetric) energy density of the boil-off gas is much lower—independently of whether it is in the pressure store 5 or in the low temperature liquid gas tank 2—than that of the liquid gas present in the low temperature liquid gas tank 2 and therefore effects a greater capacity increase for the reception of subsequently produced boil-off gas by a use of the boil-off gas instead of a use of liquid gas. There is additionally the fact that the boil-off gas remaining in the low temperature liquid gas tank 2 also represents a heat sink for the unavoidable heat input and thus contributes to a slowing of the unwanted temperature increase in the interior of the low temperature liquid gas tank 2.

So that boil-off gas can also be removed from the low temperature liquid gas tank 2 with a shut down internal combustion engine and can be supplied to the pressure store 5, a compressor drive 16 is more preferably provided that can also operate as a parasitic consumer. On the presence of a fuel cell 11, there is also in particular the option of an electric compressor drive 16 that can obtain its electrical input power from the fuel cell 11.

A removal of fuel gas in liquid form preferably only takes place via the cryopump 7 to supply the rail 3 when the required rail pressure P3 is instantaneously no longer possible while using boil-off gas or a minimum amount of boil-off gas that should remain in the low temperature liquid gas tank 2 would be fallen below by a further removal (see below). This is of advantage since the liquid gas has a density that is higher than the density of the boil-off gas held at high pressure in the pressure store 5 and higher again than the density of the boil-off gas held in the low temperature liquid gas tank 2. If fuel gas in liquid form were already obtained instead of a possible use of boil-off gas, there is an increased risk that the total capacity for the storage of the boil-off gas is exhausted during a later longer lasting non-use of the internal combustion engine, i.e. further boil-off gas can no longer be supplied to the pressure store 5 and the low temperature liquid gas tank 2 can no longer hold any further boil-off gas.

The leading off of boil-off gas from the low temperature liquid gas tank 2 into the pressure store 5 preferably takes place in each case under the condition that only a small pressure window or a small amount is present for newly incoming boil-off gas that can still be held in the low temperature liquid gas tank 2, and indeed independently of whether a pulsed or continuous operation takes place.

First, the compression energy to be used can be somewhat reduced because a smaller pressure increase has to be performed in the collective to compress the removed boil-off gas correspondingly strongly so that is can be supplied to the pressure store 5. Second, the demands on the compressor are reduced when it only has to be suitable to achieve a compression of, for example, 8 bar to, for example, 400 bar, rather than an increase from, for example, 2 bar to 400 bar. The latter relates to the performance and above all to the thermodynamic demands. Third, the boil-off gas remaining in the low temperature liquid gas tank 2 also represents a heat therein and contributes to the heat input into the low temperature liquid gas tank 2 being distributed over an overall larger amount of the fuel gas, e.g. hydrogen, stored therein, whereby the increase of the inner temperature slows.

The compressor 10 can, for example, be driven by a compressor drive 16 in the form of an electric or hydraulic motor. Such a compressor drive 16 is preferably provided for the compressor 10 that can also work independently of an operation of an internal combustion engine supplied with the fuel gas. This unit comprising the compressor 10 and the compressor drive 16 is preferably operated at a single working point at which there is a particularly high system efficiency, for example in pulsed operation. On the presence of a pulsed operation, the respective gas amounts required during a switch-on phase are preferably comparatively small.

Optionally, a multistage compression can be provided for the supply of the boil-off gas to the pressure store 5.

The gas removal from the low temperature liquid gas tank 2 takes place in the same manner in both embodiments of the invention, either via the sucking in of liquid gas via a pump that is preferably a cryopump 7 or via the boil-off valve 9. With respect to the gas removal and the taking as a basis of the following interfaces fixed here, that is (i) the outlet of the low temperature liquid gas tank 2 and (ii) the outlet of the cryopump 7, the same considerations, options, and preferences apply to all the embodiments. It must be noted that in the second embodiment, one cryopump 7 or a cryopump 7 having a compression connected downstream is sufficient that can provide the covering of the rail pressure P3, whereas in the first embodiment a pressure level that is higher again is of advantage to be able to convey a usable gas amount into the pressure store 5.

As an optional expansion of the second embodiment, a fluid return line 20 drawn in FIG. 2 is provided that leads a connection starting from the rail 3 via a valve V4 to said knot point on the suction side of the compressor 10 above the boil-off valve 9. The valve V4 is a valve that preferably only has the two switching states "open" and "closed". The valve V4 can be actuated by remote control via the control signal X4. This is provided, for example, when highly pressurized fuel gas is to be conveyed out of the rail 3, for example when an internal combustion engine in active connection with the injector device 4 is to be shut down. In accordance with the prior art, an internal combustion engine operated with hydrogen may, for example, only actually be shut down after the shutdown demand when the hydrogen amount present in the rail 3 has been reduced so much that the rail pressure P3 has reached the level of the atmospheric pressure. With the provision of the fluid return line 20, an immediate shutdown of the internal combustion engine is possible because the fuel gas or the hydrogen can be conveyed via the then open valve V4 and the compressor 10 into the pressure store 5 where it can be stored for later use. Alternatively, on the presence of a fuel cell 11, the fuel gas present in the rail can be utilized by it via the fluid return line 20. Only when (i) the fuel cell 11 is not present and (ii) fuel gas can no longer be supplied to the pressure store 5, which, however, does not occur under the preferred operating strategy, is an immediate shutdown of the internal combustion engine disadvantageous, but is nevertheless possible while maintaining the safety aspect. Alternatively to a continuation of the operation of the internal combustion engine after a shutdown demand until the store of fuel gas in the rail 3 has been exhausted, the fuel gas remaining in the rail 3 can be supplied to the disposal device via the fluid return line 20.

With respect to the first embodiment, the second embodiment provides a series of advantages that will be presented in the following. With respect to the intended capacity increase for the holding of boil-off gas, only boil-off gas is removed from the low temperature liquid gas tank 2 that has an already considerably reduced density in comparison with the liquid gas. The capacity for the buffering of fuel gas provided by the expansion can accordingly be utilized considerably better.

It is further of advantage with the second embodiment that a high proportion of the boil-off gas can be supplied to the intended use path with an onboard preparation, i.e. with the compression via a compressor 10, whereas in the first embodiment, only an increased portion of boil-off gas can be held in the low temperature liquid gas tank 2 that can be sucked off in the subsequent refueling and can be provided to a subsequent liquefaction again as a liquid gas.

In addition, a recovery of the fuel gas can be achieved by the optional provision of the fluid return line 20 so that on a sudden conveying stop of fuel gas into the rail 3 it no longer has to be led off without an energetic use.

In contrast to the second embodiment of the present invention explained in connection with FIG. 2, the first embodiment shown in FIG. 1 in contrast does not require a compressor 10 or the drive required therefor. In particular in commercially used vehicles or mobile work machines, longer downtimes are comparatively rare so that a possible use of the compressor will be a lot less extensive (if at all) and the simplified structure without the compressor is advantageous.

REFERENCE NUMERAL LIST 1 system
2 low temperature liquid gas tank
3 rail
4 injection device
5 pressure store
6 further fluid line
7 cryopump
8 valve to connect the pressure store or its bypass line
9 boil-off valve
10 compressor
11 fuel cell
12 pressure store outlet valve
13 gas pressure adjustment unit
14 inflow valve
15 check valve
16 compressor drive
17 pump drive
18 level of the liquid gas
19 heating device of the cryopump
20 fluid return line

The invention claimed is:

1. A system for supplying a gaseous fuel, comprising:
a tank that is designed as a liquid gas tank for receiving fuel in its liquid aggregate state achieved by cooling;
a rail that is fluidically connected to at least one injector device for discharging the gaseous fuel into a fuel space, wherein
a pressure store that is configured to receive the gaseous fuel and that is fluidically connectable to both the tank and the rail to buffer fuel coming from the tank and to supply it to the rail; and
a boil-off valve in fluid communication with the tank for discharging the gaseous fuel from the tank, wherein
a compressor is arranged downstream of the boil-off valve to increase pressure of the gaseous fuel discharged via the boil-off valve, with an upper pressure side of the compressor being fluidically connected to the pressure store to supply the gaseous fuel increased in pressure to the pressure store, and wherein
the rail is fluidically connectable to a suction side of the compressor to supply gaseous fuel not required in the rail to the pressure store.

2. The system in accordance with claim 1, further comprising a further fluid line that fluidically connects the tank and the rail to one another while bypassing the pressure store to lead the gaseous fuel to the rail.

3. The system in accordance with claim 2, wherein the further fluid line is connected to a pump, that is configured to convey the fuel in a liquid aggregate state from the tank and to allow it to change into a gaseous aggregate state in so doing.

4. The system in accordance with claim 3, wherein the pump whose pump mechanism can serve the conveying of the fuel in the liquid aggregate state from the tank is integrated therein and, alternatively or in addition the transposition of the fuel into the gaseous aggregate state takes place within this pump.

5. The system in accordance with claim 4, wherein a pump drive that can serve the conveying of the fuel in the liquid aggregate state from the tank is installed outside the pump and is installed outside the tank.

6. The system in accordance claim 4, further comprising a gas adjustment unit arranged upstream of the rail to set a pressure level of fuel coming from the tank and transitioned into the gaseous aggregate state that flows into the rail, with a gas pressure adjustment unit being respectively separately connected to the pressure store and the tank.

7. The system in accordance with claim 3, wherein the pump is a cryopump.

8. The system in accordance with claim 2, further having a valve that is configured to lead the gaseous fuel coming from the tank to the pressure store or to lead it to the rail by means of the further fluid line while bypassing the pressure store.

9. The system in accordance with claim 1, wherein a fuel cell is arranged downstream of the boil-off valve to convert the gaseous fuel into electrical energy, with a battery being provided to buffer the electrical energy generated in this process.

10. The system in accordance with claim 9, wherein the rail is fluidically connectable to the fuel cell to supply gaseous fuel not required in the rail to the fuel cell.

11. The system in accordance with claim 1, further comprising a pressure store discharge valve for a selective discharge of gaseous fuel in the pressure store to the rail.

12. The system in accordance with claim 1, further comprising an inflow valve in fluid communication with the tank for introducing the gaseous fuel into the tank.

13. The system in accordance with claim 1, wherein the tank is designed with multiple walls to thermally insulate a tank content.

14. The system in accordance with claim 1, wherein the tank is configured to be able to withstand an inner pressure of at least 6 bar, but only to be able to withstand a maximum inner tank pressure of up to 16 bar.

15. The system in accordance with claim 14, wherein the inner pressure is of at least 8 bar.

16. The system in accordance with claim 14, wherein the maximum inner pressure is up to 10 bar.

17. A vehicle having a fuel injection system in accordance with claim 1.

* * * * *